United States Patent
Merchant (10) Patent No.: US 9,033,357 B1
(45) Date of Patent: May 19, 2015

(54) TOW BAR WITH A SLIDING MECHANISM FOR CONVERTING LEGS THEREOF FROM AN ALIGNED TUBULAR STRUCTURE TO AN ARTICULATED STRUCTURE

(71) Applicant: Automatic Equipment Manufacturing Company, Pender, NE (US)

(72) Inventor: David Merchant, Lincoln, NE (US)

(73) Assignee: Automatic Equipment Manufacturing Company, Pender, NE (US)

( * ) Notice: Subject to any disclaimer, the term of this patent is extended or adjusted under 35 U.S.C. 154(b) by 0 days.

(21) Appl. No.: 14/138,317

(22) Filed: Dec. 23, 2013

(51) Int. Cl.
*B60D 1/54* (2006.01)
*B60D 1/167* (2006.01)
*B60D 1/155* (2006.01)

(52) U.S. Cl.
CPC *B60D 1/167* (2013.01); *B60D 1/54* (2013.01); *B60D 1/1675* (2013.01); *B60D 1/155* (2013.01)

(58) Field of Classification Search
CPC .......... B60D 1/54; B60D 1/542; B60D 1/544; B60D 1/546; B60D 1/548; B60D 1/155; B60D 1/167; B60D 1/1675; B60D 2001/542; B60D 2001/544; B60D 2001/546; B60D 2001/548
USPC .............................. 280/491.1, 491.2, 492, 493
See application file for complete search history.

(56) References Cited

U.S. PATENT DOCUMENTS

| | | | |
|---|---|---|---|
| 2,174,468 A * | 9/1939 | Kratfel | 280/491.1 |
| 3,083,040 A | 3/1963 | Hayman et al. | |
| 3,492,022 A | 1/1970 | Hansen | |
| 3,572,765 A * | 3/1971 | Tieben | 280/491.4 |
| 3,794,355 A * | 2/1974 | Cracolice | 280/482 |
| 3,806,162 A * | 4/1974 | Milner | 280/502 |
| 4,640,523 A | 2/1987 | Wolmarans | |
| 4,861,061 A | 8/1989 | Frantz | |
| 5,356,166 A * | 10/1994 | Hahne et al. | 280/491.4 |
| 5,429,382 A | 7/1995 | Duncan | |
| 5,516,140 A | 5/1996 | Hinte | |
| RE35,482 E * | 3/1997 | Johnson | 280/491.5 |
| 5,647,604 A | 7/1997 | Russell | |
| 5,711,542 A * | 1/1998 | Kendall | 280/491.4 |
| 5,873,595 A | 2/1999 | Hinte | |
| 5,887,497 A * | 3/1999 | Ensz | 81/484 |
| 5,957,477 A | 9/1999 | Ensz et al. | |

(Continued)

FOREIGN PATENT DOCUMENTS

| | | | | | |
|---|---|---|---|---|---|
| DE | 2450779 | * | 5/1976 | | B60D 1/155 |
| DE | 2638127 | * | 3/1978 | | B60D 1/155 |

(Continued)

*Primary Examiner* — Tony H. Winner
*Assistant Examiner* — Maurice Williams
(74) *Attorney, Agent, or Firm* — Donald R. Schoonover (57) ABSTRACT

A tow bar having a towing connector for releasably connecting a first hitch arrangement of a towing vehicle to a second hitch arrangement of a towed vehicle includes a pair of opposing legs, each leg having a fore section connected to the towing connector and an aft section connected to the second hitch arrangement, a pivot connector pivotally connecting the fore section to the aft section, a locking mechanism for converting the respective leg from an aligned tubular structure for towing purposes to an articulated structure for on-vehicle storage purposes, and a hanger for retaining the tow bar in a stored configuration. An auxiliary locking mechanism operatively prevents the legs from pivoting relative to the towing connector while the towed vehicle is being towed.

3 Claims, 4 Drawing Sheets

(56) References Cited

U.S. PATENT DOCUMENTS

| | | |
|---|---|---|
| 6,168,182 B1 * | 1/2001 | Ford ............................ 280/494 |
| 6,854,756 B1 | 2/2005 | Solberg |
| 7,029,021 B2 | 4/2006 | Klas |
| 7,125,031 B1 | 10/2006 | Schoonover |
| 7,390,007 B2 | 6/2008 | Helms et al. |
| 7,506,889 B2 | 3/2009 | Baltrusaitis et al. |
| 7,942,435 B1 | 5/2011 | Huston et al. |
| 8,353,522 B2 | 1/2013 | Helland et al. |
| 8,366,137 B1 * | 2/2013 | Merchant ..................... 280/493 |
| 8,662,523 B1 * | 3/2014 | Merchant ..................... 280/493 |
| 2006/0249926 A1 | 11/2006 | Smith |
| 2007/0001425 A1 * | 1/2007 | Helms et al. ............... 280/456.1 |

FOREIGN PATENT DOCUMENTS

| | | | |
|---|---|---|---|
| DE | 3802726 C2 * | 4/1995 | ............ B60D 1/155 |
| EP | 0799730 * | 3/1997 | ............ B60D 1/145 |
| GB | 2398052 A * | 8/2004 | ............ B60D 1/44 |
| WO | WO 0145969 A1 * | 6/2001 | ............ B60D 1/155 |

* cited by examiner

TOW BAR WITH A SLIDING MECHANISM FOR CONVERTING LEGS THEREOF FROM AN ALIGNED TUBULAR STRUCTURE TO AN ARTICULATED STRUCTURE

BACKGROUND OF THE INVENTION

1. Field of the Invention

The present invention relates to towing accessories and, more particularly without limitation, to tow bars for connecting a towing vehicle to a towed vehicle.

2. Description of the Related Art

A tow bar is typically used for connecting a towing hitch arrangement of a towing vehicle to a towed hitch arrangement of a vehicle to be towed, sometimes referred to herein as a towed vehicle. For most applications, the tow bar, which connects the front end of the towed vehicle to the rear end of the towing vehicle, has two tow bar legs wherein each tow bar leg has one end spaced in close proximity to the corresponding end of the other tow bar leg to form an apex, and the other ends of the tow bar legs are spaced apart forming the sides of an isosceles triangle. The triangular configuration causes the towed vehicle to closely track the towing vehicle, both along straightaways and around corners.

For tow bar applications, such as where heavy massive equipment is moved a relatively short distance, such as where an airliner is backed away from a terminal for example, the tow bar may have only one tow bar leg. For such applications, one end of the tow bar leg may be connected to the front end of the towed vehicle and the other end of the tow bar leg connected to the front end of the towing vehicle so the operator of the towing vehicle can face the towed vehicle to thereby enable a user to carefully observe the response of the towed vehicle as it is being slowly displaced by the towing vehicle.

Tow bars are generally structured to accommodate variations in attitude that inherently exist between the towing and towed vehicles, which variations are constantly occurring and continuously changing. One such variation in attitude between the vehicles is the instantaneous sidewise tilt of the towing vehicle relative to the instantaneous sidewise tilt of the towed vehicle, such as the rocking motion which occurs when traversing uneven or rough underlying surfaces for example. This phenomenon, sometimes referred to as "roll", can be accommodated by tow bar apparatus designed to accommodate rotations between the towing and towed vehicles about a longitudinal, horizontal axis, see the "x"-axis in FIG. 1.

Another such variation in attitude between the vehicles is the instantaneous horizontal direction in which the towing vehicle is traveling relative to the instantaneous horizontal direction in which the towed vehicle is traveling, such as when the vehicles are traversing an unbanked corner for example. This phenomenon, sometimes referred to as "yaw", can be accommodated by apparatus designed to accommodate rotations between the towing and towed vehicles about a vertical axis, see the "y"-axis in FIG. 1.

Finally, another such variation in attitude between the vehicles is the instantaneous elevation of the towing vehicle relative to the instantaneous elevation of the towed vehicle. A related variation in attitude between the vehicles is the instantaneous ascent/descent orientation of the towing vehicle relative to the instantaneous ascent/descent orientation of the towed vehicle. Both of these related variations in attitude can be accommodated by apparatus designed to accommodate rotations between the towing and towed vehicles about a transverse, horizontal axis, sometimes referred to as the "pitch" axis, see the "z"-axis in FIG. 1.

During actual towing procedures, all combinations of the roll, yaw and pitch phenomena are constantly occurring and continuously changing. Prior art is replete with tow bar designs that have been developed in an attempt to accommodate these phenomena, some of those designs being more successful than others. For example, a ball hitch/hitch ball receiver combination securing a tow bar to a towing vehicle can theoretically accommodate all three of the roll, yaw and pitch phenomena. Although the ability of such a combination to accommodate yaw is encouraging, unfortunately the ability of such a combination to accommodate either pitch or roll is extremely limited, where failure to closely abide by such limitations can produce disastrous and even fatal results.

Another commonly used arrangement involves using a conventional receiver hitch in combination with a square tube-shaped shank. Although such an arrangement may be convenient for connecting a tow bar to a towing vehicle, this type of connection by itself provides absolutely no ability to accommodate any one of the three roll, yaw or pitch phenomena. As a result, the tow bar and/or the connections between the tow bar and the vehicles must be relied upon to provide a solution for minimizing the potentially detrimental effects of this type of hitch arrangement.

Still another commonly used arrangement involves using a pintle hitch in combination with a lunette ring, particularly for towing heavy military or construction equipment. Although this combination has the ability to accommodate pitch and yaw, unfortunately the ability of this combination to accommodate roll is somewhat limited. Also, due to a typical looseness of fit between the pintle hitch and the lunette ring, some swaying of the towed vehicle relative to the towing vehicle inherently occurs.

The ability to manually utilize all three pitch, yaw and roll rotations generally greatly simplifies connecting a tow bar between the towing and towed vehicles. For example, a tow bar is sometimes first connected to a towing vehicle followed by connecting the tow bar to the towed vehicle. Some tow bars require precise fore-to-aft, horizontal, and/or angular alignment of the two tow bar leg connectors with mating connectors of the towed hitch arrangement so connecting pins can be inserted through aligned orifices while the tow bar components are being manually held in place.

Such activity can be extremely stressful, sometimes requiring the efforts of more than one person, particularly when connecting massive tow bars such as those used for towing heavy military or construction equipment for example. Such stress and effort could be substantially reduced if each of the tow bar leg connectors could be individually articulated in close proximity to the towed vehicle so each tow bar leg connector can be easily and conveniently mated with the hitch arrangement of the towed vehicle.

What is preferred is a tow bar wherein each tow bar leg can be easily and independently articulated, both three-dimensionally and about all three axes, to thereby simplify and expedite connecting a tow bar between the vehicles.

Although some prior art tow bars have self-storing capability so they can remain attached to the rear end of a towing vehicle or to the front end of a towed vehicle, many of such prior art tow bars have parts which are difficult to apply, unreliable, and/or easily lost or misplaced, and/or require the use of installation tools which may also be easily lost, misplaced or unavailable when needed.

What is needed is a tow bar having self-storing capability which is structured to provide ease and reliability of storage and eliminates the possibility of loss or misplacement of components thereof and also eliminates the need for tools— which may also be lost, misplaced or unavailable when needed—for installing such components.

Some prior art tow bars have tubularly-shaped legs, which are commonly used not only for their esthetic appearance but also for their ease of handling and for their strength characteristics. For example, strength characteristics of tubular legs can generally be improved by simply providing tubes with thicker walls.

An example of a prior art tow bar which provides some of the above-mentioned features is disclosed in U.S. Pat. No. 8,353,522 to Helland et al. for a "Towing Assembly". Unfortunately, Helland et al. requires extra bolts and nuts for locking the angular orientation of the tow bar legs relative to a lunette ring, and requires even further extra bolts and nuts for locking the different shafts of the tow bar legs in end-to-end configurations. As aforesaid, it is not uncommon for such bolts and nuts to be lost or misplaced prior to and during installation thereby complicating and frustrating connections between the towing and towed vehicles, not to mention the loss, misplacement or unavailability of tools needed to install those extra bolts and nuts.

What is needed is a locking mechanism structured as a non-removable element of the tow bar, wherein separate extra parts and the need for tools to install those separate extra parts, are eliminated.

In addition, the pivot joints of the tow bar legs, as in the of Helland-type apparatus for example, may be the weakest features of the tow bar due to the largely unprotected exposure of such joints to debris and other environmental hazards, and have reduced capability to withstand the substantial stresses and strains to which tow bars are subjected.

What is needed is a mechanism structured to not only shield and protect pivot features of the joints but also to reinforce and further strengthen the tow bar legs themselves.

Another tow bar leg feature that can sometimes simplify facilitating on-vehicle storage is to provide articulated legs. As aforesaid, the pivot joints that provide the articulation is generally the weakest part of such tow bar legs, which jeopardizes the ability of such tow bars to withstand the harsh adverse environment to which tow bars are subjected.

What is needed is a tow bar having legs which exhibit desirable aligned tubular characteristics for towing purposes, and which are easily and quickly convertible to an articulated structure for on-vehicle storage purposes, wherein the tow bar is simply and easily convertible from and to a stored configuration and a deployed configuration without the need for installing or removing extra parts and/or the need for tools to install or remove those extra parts.

SUMMARY OF THE INVENTION

The improvements of the present invention for a convertible tow bar with a sliding mechanism for converting legs thereof from an aligned tubular structure for towing purposes to an articulated structure for on-vehicle storage purposes includes a first hitch arrangement mounted to the rear of a towing vehicle; a second hitch arrangement mounted to the front of a towed vehicle; a towing connector releasably connectable to the first hitch arrangement; a pair of opposing legs connected to the towing connector; and a non-leg-pivoting mechanism to selectively prevent pivoting of the tow bar legs relative to the towing connector.

Each leg of the opposing pair of legs includes a fore section having a proximal end connected to the towing connector, a distal end, and a fore axis; an aft section having a proximal end, a distal end, and an aft axis, a pivot connector pivotally connecting the distal end of the fore section to the proximal end of the aft section wherein the pivot connector enables pivoting of the fore and aft sections to and from an end-to-end configuration whereat the fore and aft sections are colinearly aligned and a side-by-side configuration whereat the fore and aft sections are arranged parallel alongside each other; a leg locking mechanism structured to be longitudinally slidable to and from a locked and deployed configuration whereat the fore and aft sections thereof are colinearly aligned and an unlocked configuration wherein the leg locking mechanism is structured to convert the respective leg to and from an aligned tubular structure for towing purposes and an articulated structure for on-vehicle storage purposes; a shielding and reinforcing mechanism structured to shield and reinforce the pivot connector while disposed in the locked and deployed configuration, and a leg connector structured to releasably connect the distal end of the aft section to the second hitch arrangement.

The non-leg-pivoting mechanism includes a slot in the towing connector and is structured to be longitudinally slidable to and from a leg-pivoting configuration and a non-leg-pivoting configuration.

PRINCIPAL OBJECTS AND ADVANTAGES OF THE INVENTION

The principal objects and advantages of the present invention include: providing a tow bar wherein each tow bar leg can be easily and independently articulated, both three-dimensionally and about most if not all of the three axes; providing such a tow bar having self-storing capability that is structured to provide ease and reliability of storage and eliminates the possibility of loss or misplacement of components thereof; providing such a tow bar having legs which are simply and easily convertible to and from a locked and deployed configuration and an unlocked and stored configuration without the need for separate extra parts; providing such a tow bar wherein the locking mechanism eliminates the need for tools to install those separate extra parts, which tools may be unavailable when needed; providing such a tow bar having a mechanism that is structured to not only reinforce and strengthen pivot features of the tow bar legs but also shields and protects those pivot features from unwanted hazards; providing such a tow bar having legs which exhibit desirable aligned tubular characteristics for towing purposes and are easily and quickly convertible to an articulated structure for on-vehicle storage purposes; and generally providing such a tow bar that is reliable in performance, capable of long-lasting life, and particularly well adapted for the proposed usages thereof.

Other objects and advantages of this invention will become apparent from the following description taken in conjunction with the accompanying drawings wherein are set forth, by way of illustration and example, certain embodiments of this invention.

DETAILED DESCRIPTION OF THE INVENTION

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

Figure 1:
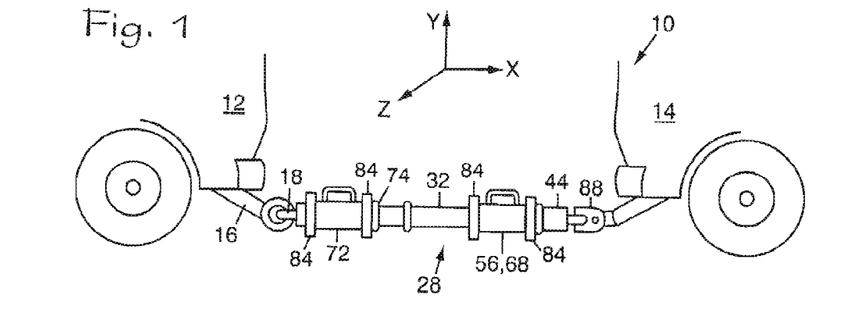
FIG. 1 is a schematic representation of a side elevational view of a convertible tow bar having a sliding mechanism for converting an aligned tubular structure thereof for towing purposes to an articulated structure thereof for on-vehicle storage purposes, according to the present invention.

The reference numeral 10 generally refers to an invention for a tow bar for connecting a towing vehicle 12 to a towed vehicle 14, sometimes referred to herein as the "convertible tow bar", wherein the tow bar includes a sliding reinforcing/shielding mechanism for converting legs of the tow bar from a locked and deployed configuration for towing purposes to an unlocked and articulated structure for on-vehicle storage purposes in accordance with the present invention, as shown in FIGS. 1 through 13. The convertible tow bar 10 includes a first hitch arrangement 16 mounted to the rear of the towing vehicle 12, a towing connector 18 pivotally and releasably connectable to the first hitch arrangement 16, and a second hitch arrangement 20 with mounting brackets 22 mounted to the front of the towed vehicle 12, as shown in FIG. 1 and as hereinafter described. For example, the first hitch arrangement 16 may include a pintle hitch, and the towing connector 18 may include a lunette ring.

It is to be understood that for some applications of the present invention, the first hitch arrangement 16 may be mounted to the rear of the towing vehicle 12 and the second hitch arrangement 20 may be mounted to the front end of the towed vehicle 14 as described herein. Alternatively for other applications, the first hitch arrangement 16 may be mounted to the front end of the towed vehicle 14 and the second hitch arrangement 20 may be mounted to the rear of the towing vehicle 12 within the spirit and scope of the present invention with modifications thereto, which will be obvious to those having ordinary skill in the art based on the disclosure herein.

Figures 2, 3, 4:
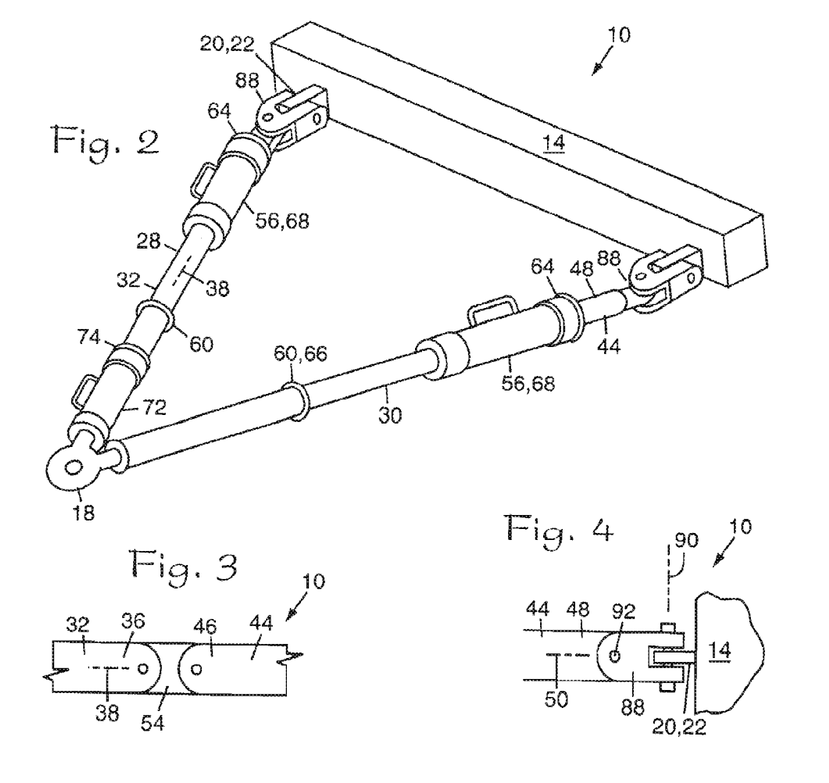
FIG. 2 is a perspective view of the convertible tow bar.
FIG. 3 is a schematic representation of a fragmentary top plan view of the convertible tow bar showing a pivot joint of a leg thereof.
FIG. 4 is a schematic representation of an exemplary leg connector of the convertible tow bar.
Figure 5:
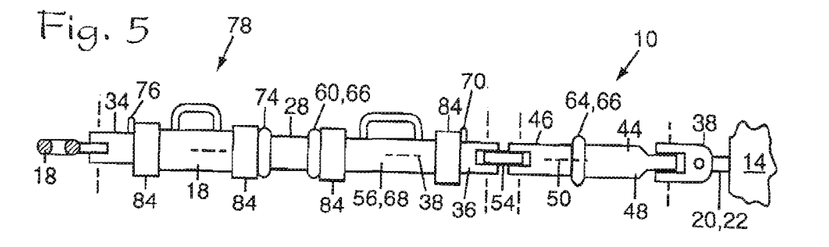
FIG. 5 is a schematic representation of a side elevational view of a leg of the convertible tow bar showing leg locking and non-leg-pivoting mechanisms thereof in unlocked configurations.

The convertible tow bar 10 includes opposing first and second tow bar legs 28,30, each having a fore section 32 with a proximal end 34 connected to the towing connector 18, a distal end 36, and a fore axis 38; and an aft section 44 with a proximal end 46, a distal end 48, and an aft axis 50. The proximal ends 34 of the tow bar legs 28,30 are pivotally connected to the towing connector 18. Each leg 28,30 also includes a pivot connector 54 pivotally connecting the proximal end 46 of the aft section 44 to the distal end 36 of the fore section 32 as shown in FIGS. 3 and 5.

Preferably, the cross-sectional profile of the fore and aft sections 32,44 are circularly-shaped, but it is to be understood that the cross-sectional profile of the fore and aft sections 32,44 may be square-shaped, triangularly-shaped, or any other profile as desired.

Figure 6:
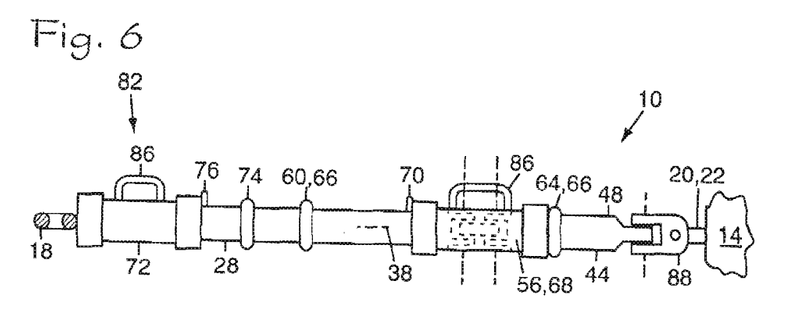
FIG. 6 is a schematic representation of a side elevational view of the leg of the convertible tow bar, similar to FIG. 5 but showing the leg locking and non-leg-pivoting mechanisms thereof in locked configurations.

Each leg 28,30 further includes a leg locking mechanism 56 structured to releasably lock the respective tow bar leg 28,30 in a locked or deployed configuration 58 wherein the fore and aft sections 32, 44 thereof are colinearly aligned, as shown in FIG. 6. Each leg locking mechanism 56 generally includes a first leg stop 60 positioned on the respective fore section 32 such that as the leg locking mechanism 56 abuts the first leg stop 60, the leg locking mechanism 56 is positioned clear of the respective pivot connector 54 thereby placing the leg 28,30 in an unlocked and articulable configuration 62 as shown in FIG. 5.

Each leg locking mechanism 58 also generally includes a second leg stop 64 positioned on the aft section 44 such that as the leg locking mechanism 56 abuts the second leg stop 64, the leg locking mechanism 56 spans the respective pivot connector 54 thereby placing the respective leg 28,30 in an locked and deployed configuration 58, as shown in FIG. 6. For example, each of the first and second leg stops 60,64 may include a peripheral ridge 66, or portions thereof, about the respective fore and aft sections 32, 44.

Each leg 28,30 is locked in the locked and deployed configuration 58 by slidably moving the respective leg locking mechanism 56 longitudinally along the aligned fore and aft sections 32,44 such as from the first leg stop 60 to the second leg stop 64 wherein the leg locking mechanism 56 spans the respective pivot connector 54, overlapping both the distal end 36 of the fore section 32 and the proximal end 46 of the aft section 44 adjacent to the pivot connector 56.

The leg locking mechanisms 56 are not only structured to lock the legs 28,30 in the locked and deployed configuration 58 but are also structured to operatively provide a combination reinforcing and shielding mechanism 68 to reinforce and shield the pivot connector 54 enclosed therein during towing operations. Simply stated, the leg locking mechanisms 56 convert the legs 28,30 to and from an aligned tubular structure and an articulated structure.

Each leg locking mechanism 56 also generally includes latches 70 structured and situated to releasably latch the leg locking mechanism 56 in either the locked and deployed configuration 58 or in the unlocked and articulable configuration 62. For example, each latch 70 may be a biased detent or other suitable device, which automatically prevents further displacement of the respective leg locking mechanism 56 until the respective latch 70 is subsequently released.

Figure 7:
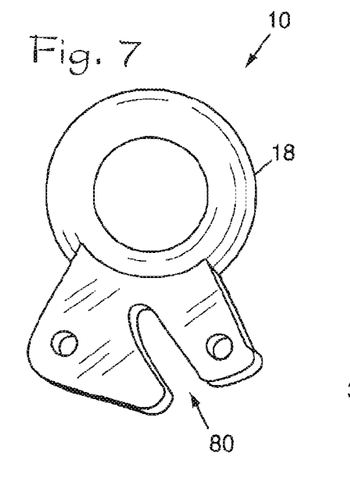
FIG. 7 is an enlarged plan view of the convertible tow bar showing a slot of a towing connector thereof.
Figure 8:
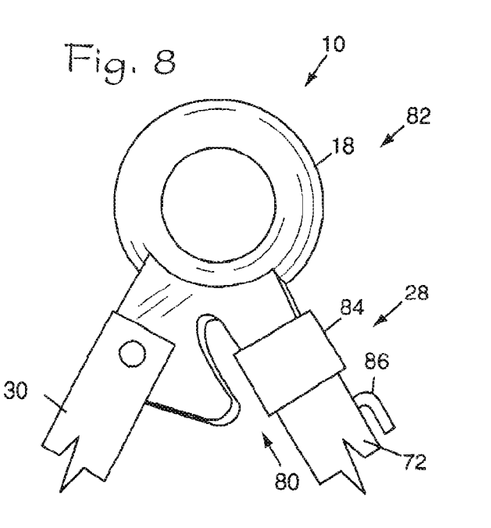
FIG. 8 is an enlarged plan view of the convertible tow bar, similar to FIG. 7 but showing the convertible tow bar in a non-leg-pivoting configuration.

Unless otherwise prevented during towing operations, the legs 28,30 may tend to oscillate back and forth about their pivotal connections to the towing connector 18, further exacerbating the inherent swaying back and forth when towing a vehicle using a pintle-lunette hitch arrangement. To prevent such exacerbation, at least one of the tow bar legs, leg 28 for example, generally includes an auxiliary locking mechanism 72, structured similarly to the leg locking mechanism 56, to thereby eliminate pivoting of the legs 28,30 relative to the towing connector 18 during towing operations. The auxiliary locking mechanism 72 generally includes a sleeve 73, and the towing connector 18 having a slot 80, as hereinafter described and as shown in FIG. 7. The sleeve 73 is structured to be longitudinally slidable along the fore section 32 to a non-leg-pivoting configuration 82, as shown in FIG. 8, wherein the sleeve 73 is inserted into slot 80, thereby operatively preventing the fore sections 32 from pivoting relative to the towing connector 18.

The auxiliary locking mechanism 72 generally includes an auxiliary stop 74 and at least one auxiliary latch 76, such as a biased detent or other suitable device for example. The auxiliary stop 74 is positioned on the respective fore section 32 such that as the sleeve 73 abuts the auxiliary stop 74, the auxiliary locking mechanism 72 is positioned in a leg-pivoting configuration 78, clear of the slot 80 and the pivoting connection between the fore section 32 and the towing connector 18, as shown in FIG. 5. The auxiliary latch 76 is positioned to releasably lock the auxiliary locking mechanism 72 in either the leg-pivoting configuration 78 or the non-leg-pivoting configuration 82.

For some applications, it may be desirable to provide bands 84 or otherwise thicken the material at the ends of the leg locking mechanisms 56 and the sleeve 72 to further strengthen them.

The leg locking mechanisms 56 and the sleeve 73 may include gripping mechanisms 86 for manual manipulation purposes, such as handles secured thereto for example, as shown in FIG. 5. If desired, the handles may be pivotally attached and shaped to nestle beside an adjacent surface thereof.

The tow bar apparatus 10 also includes a leg connector 88 connected to the distal end 48 of each aft section 44 and is structured to releasably connect the aft section 44 to the mounting brackets 22 of the second hitch arrangement 20. Each leg connector 88 is preferably structured to at least operatively provide a pitch axis 90 and a yaw axis 92 between the tow bar legs 28,30 and the towed vehicle 14 as shown in FIG. 4. For some applications, it may be desirable to modify the leg connectors 88 wherein each can also pivot about the aft axis 50 of its aft section 44.

Figure 9:
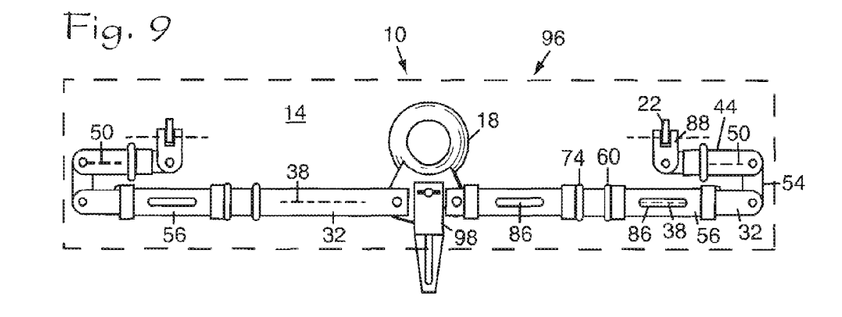
FIG. 9 is a schematic representation of the convertible tow bar showing a hanger mechanism thereof in a stored configuration.

The pivot connector 54 of each leg 28,30 is structured to enable the fore section 32 thereof to be pivotally spaced side-by-side relative to the respective aft section 44 such that the fore and aft sections 32,44 of each leg 28,30 can be arranged substantially parallel to each other, the fore sections 32 of the first and second legs 28,30 can be substantially co-linearly arranged, and the aft sections 44 of the first and second legs 28,30 can also be substantially co-linearly arranged, as schematically shown in FIG. 9. Preferably, the mounting brackets 22 are appropriately spaced apart to thereby enable storing the tow bar 10 in a low profile, storage configuration 96. A hanger mechanism 98 may be provided to releasably secure the convertible tow bar 10 in a stored configuration 96, as shown in FIG. 9.

Figures 10, 11:
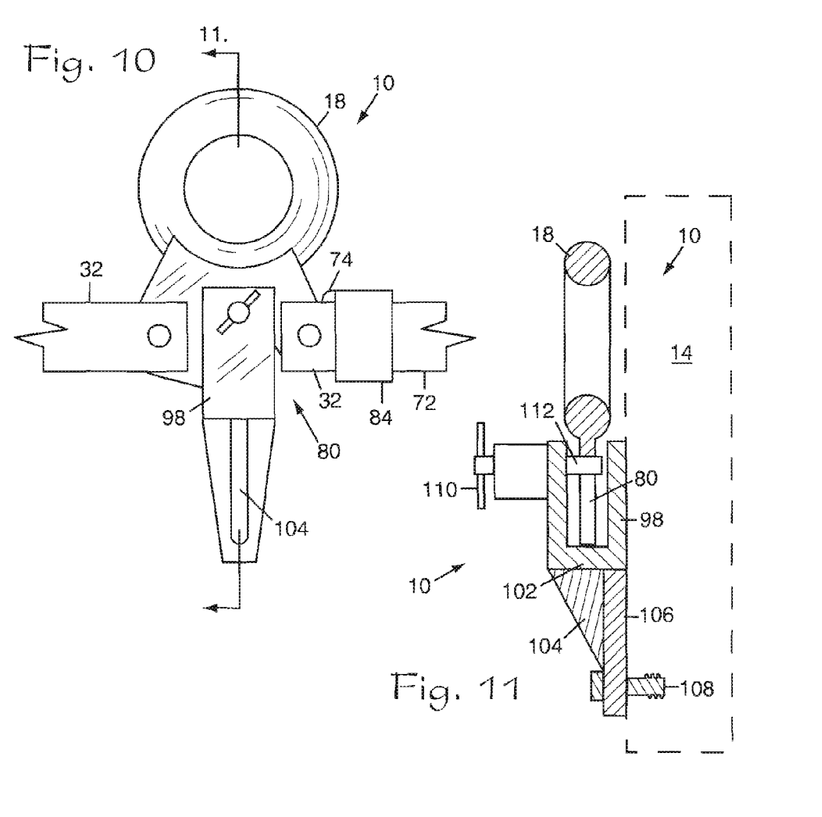
FIG. 10 is a schematic representation of an enlarged and fragmentary view of the convertible tow bar, similar to FIG. 10 but showing the hanger mechanism in the stored configuration.
FIG. 11 is a schematic representation of a cross-sectional view of the convertible tow bar, taken substantially along line 11-11 of FIG. 10 and showing the hanger mechanism in the stored configuration.
Figure 12:
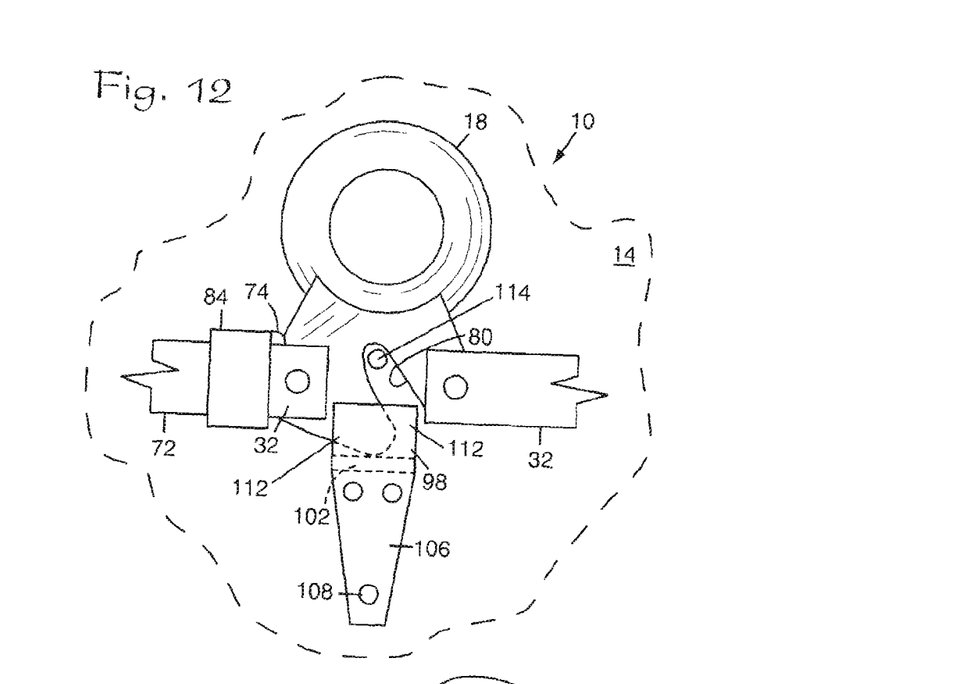
FIG. 12 is a schematic representation, taken from the rear of FIG. 10 and showing the hanger mechanism of the convertible tow bar in the stored configuration, according to the present invention.

Schematic representations of an exemplary hanger mechanism 98 are shown in FIGS. 10-12, wherein the convertible tow bar 10 is mountable in the stored configuration 96. The hanger mechanism 98 includes a platform 102 supported by a gusset 104 and a plate 106 secured to the towed vehicle 14 by fasteners 108. The towing connector is supported by the platform 102. A securing device 110 having a spring-biased plunger 112 with a distal end 114 extending through the slot 80 of the towing connector 18. The hanger mechanism 98 also includes a pair of upright fingers 116 spaced adjacent to the proximal ends 34 of the fore sections 32 of tow bar legs 28,30. The distal end 114 of the slot 80 and the fingers 116 are spaced and structured to cooperatively prevent the towing connector 18 from being lifted out of the hanger mechanism 98 until the distal end 114 of the plunger 112 of the securing device 110 is retracted from the slot 80.

Figure 13:
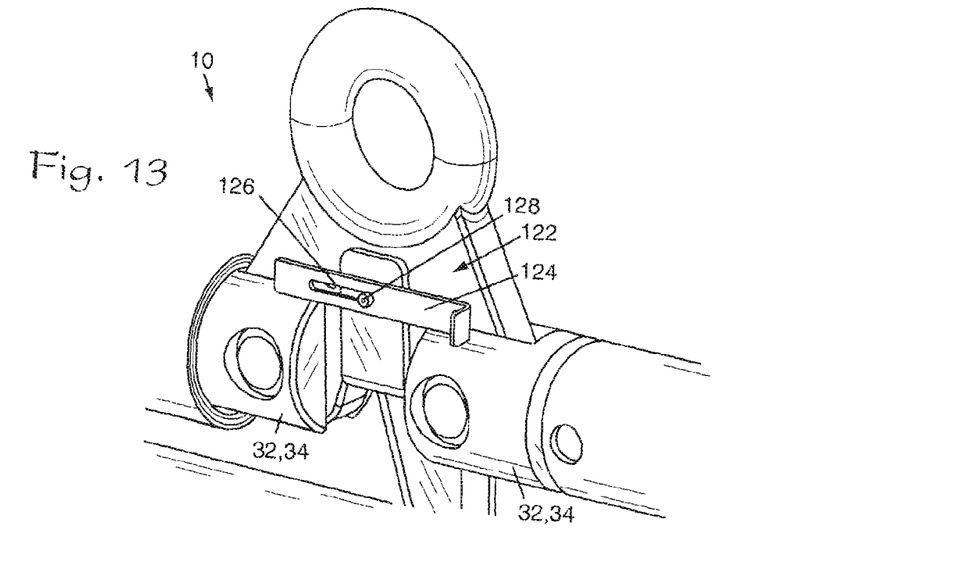
FIG. 13 is a schematic representation of a perspective view of the convertible tow bar, similar to FIG. 10 but showing an alternative mechanism for retaining the convertible tow bar in the stored configuration, according to the present invention.

Alternatively, the present invention 10 may include a retaining mechanism 122 to releasably retain the convertible tow bar 10 in the stored configuration 96 as exemplarily and schematically shown in FIG. 13. The retaining mechanism 122 includes a slider 124 with a slot 126 pivotally mounted about a pin 128. When the legs 28,30 are positioned in the deployed configuration 58, the slider 124 is oriented such that it does not interfere with the proximal ends 34 of the fore sections 32. When the tow bar 10 is being positioned in the stored configuration 96, the slider 124 is pivoted about the pin 128 and slid sidewise to thereby retain the proximal ends 34 of the fore sections 32 in colinear alignment as shown in FIG. 13. To subsequently prepare for towing, the reverse procedure is followed to thereby allow the tow bar legs 28,30 to be displaced to the deployed configuration 58.

In an application of the present invention, a towing vehicle 12 is positioned in front of the towed vehicle 14 at a distance approximating the anticipated spacing between the two vehicles during towing operations, without necessarily accurately aligning the towing vehicle 12 with the towed vehicle 14. The lunette ring 18 is connected to the pintle hitch 16 of the first hitch arrangement. Each leg 28,30 and the respective leg connector 90 is then articulated three-dimensionally about any or all of the roll, pitch and yaw axes of the tow bar apparatus 10 as necessary to independently and releasably connect the leg connectors to the mounting brackets 22.

After both of the leg connectors 84 have been connected to the mounting brackets 22, the towing vehicle 12 is slowly maneuvered forwardly away from the towed vehicle 14 until the fore and aft sections 32,44 of each respective leg 28,30 are colinearly aligned. The leg locking mechanisms 58 are then slidingly and longitudinally displaced until the latches 70 lock the legs 28,30 in the deployed configuration 58 whereat the legs 28,30 form the sides of an isosceles triangle as shown in FIG. 2, thereby converting the tow bar legs 28,30 to tubular structures wherein the leg locking mechanisms 58 also reinforce the legs 28,30 and shield the pivot connectors 54 from debris and other towing environment hazards.

In addition, the sleeve 73 is slidingly and longitudinally displaced until the auxiliary latch 76 locks the sleeve 73 in the slot 80 to thereby preventing pivoting of the legs 28,30 relative to the towing connector 18 while the towed vehicle is being towed.

After connecting safety chains and electrical connections between the towing and towed vehicles 12,14, the tandem combination of the towing and towed vehicles is then ready for towing.

In situations whereat the tow bar apparatus is already mounted on one of the vehicles in the stored configuration 96, preparing the vehicles for towing is a simple and expeditious process: space the vehicles close to each other, release the legs 12,14 from the stored configuration 96, connect the lunette ring 18 to the pintle hitch 16, slowly maneuver the towing vehicle 12 forwardly until the fore and aft sections 32,44 of each leg 28,30 are aligned, release the latches 70,76 allowing each of the leg and auxiliary locking mechanisms 36,72 to be displaced to the deployed and non-leg-pivoting configurations 58,82, connect the safety chains and electrical connections, and go.

After the towed vehicle 14 has been delivered to the destination, the tow bar apparatus 10 can be easily and expeditiously returned to the stored configuration 96. The leg and auxiliary locking mechanisms 56,72 are slidably displaced to their unlocked and leg-pivoting configurations 62,78, and the lunette ring 18 is released from the pintle hitch 16 while the leg connectors 88 remain pivotally connected to the mounting brackets 22 of the second hitch arrangement 20. The leg connectors are allowed to pivot downwardly with the distal ends 48 of the aft sections 44 directed toward each other and the proximal ends 34 of the fore sections 32 directed toward each other as shown in FIG. 9. The lunette ring 18 is then releasably secured to the hanger mechanism 98 thereby storing the convertible tow bar 10 in the low-profile stored configuration 96 without the need for misplaceable extra parts and/or tools to install them.

It is to be understood that while certain forms of the present invention have been illustrated and described herein, it is not to be limited to the specific forms or arrangement of parts as described and shown.

I claim:

1. A tow bar for towing a towed vehicle behind a towing vehicle, the tow bar comprising:
    (a) a first hitch arrangement mounted to a rear of a towing vehicle;
    (b) a second hitch arrangement mounted to a front of the towed vehicle;
    (c) a towing connector structured to be releasably connectable to the first hitch arrangement;
    (d) a pair of opposing legs, each leg including:
        (1) a fore section having a proximal end connected to the towing connector, a distal end, and a fore axis,
        (2) an aft section having a proximal end, a distal end, and an aft axis,
        (3) a pivot connector pivotally connecting the distal end of the fore section to the proximal end of the aft section,
        (4) a leg locking, reinforcing and shielding mechanism structured to:
            (A) releasably lock the leg in a deployed configuration when the fore and aft sections are colinearly aligned by slidably moving the leg locking, reinforcing, and shielding mechanism longitudinally along the aligned fore and aft sections, and slidably convert the respective leg from an aligned tubular structure for towing purposes to an articulated structure for on-vehicle storage purposes, and
            (B) reinforce the leg and shield the pivot connector when the towed vehicle is being towed by the towing vehicle;
        (5) a leg connector structured to releasably connect the distal end of the aft section to the second hitch arrangement; and
    (e) an auxiliary locking mechanism structured to be displaceable to and from a leg-pivoting configuration and a non-leg-pivoting configuration, wherein the auxiliary locking mechanism comprises:
        (1) a sleeve;
        (2) the towing connector having a slot structured to receive the sleeve; and
        (3) at least one auxiliary latch structured and configured to releasably lock the auxiliary locking mechanism in either the leg-pivoting configuration or the non-leg-pivoting configuration.

2. A tow bar for towing a towed vehicle behind a towing vehicle, the tow bar comprising:
    (a) a first hitch arrangement mounted to a rear of a towing vehicle;
    (b) a second hitch arrangement mounted to a front of the towed vehicle;
    (c) a towing connector structured to be releasably connectable to the first hitch arrangement;
    (d) a pair of opposing legs, each leg including:
        (1) a fore section having a proximal end connected to the towing connector, a distal end, and a fore axis,
        (2) an aft section having a proximal end, a distal end, and an aft axis,
        (3) a pivot connector pivotally connecting the distal end of the fore section to the proximal end of the aft section, wherein the pivot connector is structured and configured to allow the fore section to be pivotally spaced alongside the respective aft section such that the respective fore and aft sections are substantially parallel,
        (4) a leg locking, reinforcing and shielding mechanism structured to:
            (A) releasably lock the leg in a deployed configuration when the fore and aft sections are colinearly aligned by slidably moving the leg locking, reinforcing, and shielding mechanism longitudinally along the aligned fore and aft sections, and slidably convert the respective leg from an aligned tubular structure for towing purposes to an articulated structure for on-vehicle storage purposes, and
            (B) reinforce the leg and shield the pivot connector when the towed vehicle is being towed by the towing vehicle;
        (5) a leg connector structured to releasably connect the distal end of the aft section to the second hitch arrangement; and
    (e) an auxiliary locking mechanism structured to be displaceable to and from a leg-pivoting configuration and a non-leg-pivoting configuration, and
    (f) a hanger mechanism including:
        (1) the towing connector including a slot,
        (2) a platform secured to the towed vehicle, and
        (3) a securing device mounted to the platform and having a biased plunger with a distal end normally extending through the slot,
        (4) wherein the hanger mechanism is structured and configured to cooperatively a prevent the towing connector from being released from a stored configuration until the distal end of the plunger has been retracted from the slot, and to releasably retain the tow bar in the stored configuration;
    (g) wherein the tow bar is structured to be mountable in the stored configuration whereat the fore sections of the first and second legs are substantially aligned with each other and the aft sections of the first and second legs are substantially aligned with each other.

3. A tow bar for towing a towed vehicle behind a towing vehicle, the tow bar comprising:
    (a) a first hitch arrangement mounted to a rear of a towing vehicle;
    (b) a second hitch arrangement mounted to a front of the towed vehicle;

(c) a towing connector structured to be releasably connectable to the first hitch arrangement;
(d) a pair of opposing legs, each leg including:
  (1) a fore section having a proximal end connected to the towing connector, a distal end, and a fore axis,
  (2) an aft section having a proximal end, a distal end, and an aft axis,
  (3) a pivot connector pivotally connecting the distal end of the fore section to the proximal end of the aft section wherein the pivot connector is structured and configured to allow the fore section to be pivotally spaced alongside the respective aft section such that the respective fore and aft sections are substantially parallel,
  (4) a leg locking, reinforcing and shielding mechanism structured to:
    (A) releasably lock the leg in a deployed configuration when the fore and aft sections are colinearly aligned by slidably moving the leg a locking, reinforcing, and shielding mechanism longitudinally along the aligned fore and aft sections, and slidably convert the respective leg from an aligned tubular structure for towing purposes to an articulated structure for on-vehicle storage purposes, and
    (B) reinforce the leg and shield the pivot connector when the towed vehicle is being towed by the towing vehicle,
  (5) a leg connector structured to releasably connect the distal end of the aft section to the second hitch arrangement;
(e) an auxiliary locking mechanism structured to be displaceable to and from a leg-pivoting configuration and a non-leg-pivoting configuration; and
(f) a hanger mechanism structured to releasably retain the tow bar in a stored configuration, wherein the hanger mechanism further comprises a retaining mechanism having a pivotally mounted slider structured and configured to retain proximal ends of the fore sections of the legs in colinear alignment in the stored configuration;
(g) wherein the tow bar is structured to be mountable in the stored configuration whereat the fore sections of the first and second legs are substantially aligned with each other and the aft sections of the first and second legs are substantially aligned with each other.

* * * * *